United States Patent
Baker et al.

(10) Patent No.: US 10,474,061 B2
(45) Date of Patent: Nov. 12, 2019

(54) REDUCED CAPACITY TONER CARTRIDGE FOR AN ELECTROPHOTOGRAPHIC IMAGE FORMING DEVICE HAVING AN ISOLATED TONER VOLUME SURROUNDING AN AUGER OF THE TONER CARTRIDGE

(71) Applicant: LEXMARK INTERNATIONAL, INC., Lexington, KY (US)

(72) Inventors: Marc Frazier Baker, Georgetown, KY (US); Kyle Benjamin Freels, Georgetown, KY (US); Mark William Johnson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 40 days.

(21) Appl. No.: 15/903,075

(22) Filed: Feb. 23, 2018

(65) Prior Publication Data

US 2019/0265610 A1 Aug. 29, 2019

(51) Int. Cl.
*G03G 15/08* (2006.01)
*G03G 21/18* (2006.01)
*B23P 19/04* (2006.01)

(52) U.S. Cl.
CPC .......... *G03G 15/0877* (2013.01); *B23P 19/04* (2013.01); *G03G 15/0872* (2013.01); *G03G 21/181* (2013.01); *G03G 21/1821* (2013.01)

(58) Field of Classification Search
CPC .......................... G03G 21/1857; G03G 21/186
USPC ........................................................ 399/111
See application file for complete search history.

(56) References Cited

U.S. PATENT DOCUMENTS

| | | | | |
|---|---|---|---|---|
| 4,766,457 A | * | 8/1988 | Barker | G03G 15/08 399/106 |
| 5,426,492 A | * | 6/1995 | Diehl | G03G 15/0875 222/DIG. 1 |
| 5,835,828 A | * | 11/1998 | Jyoroku | G03G 15/0875 399/256 |
| 6,229,976 B1 | * | 5/2001 | Kimura | G03G 15/0872 222/DIG. 1 |
| 7,076,188 B2 | | 7/2006 | Askren et al. | |
| 8,014,703 B2 | * | 9/2011 | Ohmura | G03G 15/0877 399/254 |
| 8,644,737 B2 | * | 2/2014 | Oikawa | G03G 15/0893 399/254 |
| 8,867,966 B2 | | 10/2014 | Acosta et al. | |
| 8,948,660 B2 | | 2/2015 | Baker et al. | |
| 9,063,460 B2 | * | 6/2015 | Abler | G03G 15/0875 |
| 2005/0207786 A1 | * | 9/2005 | Askren | G03G 15/0875 399/119 |
| 2010/0189455 A1 | * | 7/2010 | Kim | G03G 15/0893 399/53 |
| 2010/0310277 A1 | * | 12/2010 | Kamano | G03G 15/0875 399/263 |

* cited by examiner

*Primary Examiner* — Quana Grainger

(57) ABSTRACT

A toner cartridge according to one example embodiment includes a housing having a toner reservoir. An outlet is positioned on the housing for exiting toner from the toner cartridge. An insert is selectably installable in the toner reservoir. The insert separates a first portion of the toner reservoir that is in fluid communication with the outlet from a remainder of the toner reservoir when the insert is installed in the toner reservoir providing a reduced capacity toner reservoir in the first portion of the toner reservoir.

5 Claims, 12 Drawing Sheets

REDUCED CAPACITY TONER CARTRIDGE FOR AN ELECTROPHOTOGRAPHIC IMAGE FORMING DEVICE HAVING AN ISOLATED TONER VOLUME SURROUNDING AN AUGER OF THE TONER CARTRIDGE

CROSS REFERENCES TO RELATED APPLICATIONS

None.

BACKGROUND

1. Field of the Disclosure

The present disclosure relates generally to image forming devices and more particularly to a reduced capacity toner cartridge for an electrophotographic image forming device.

2. Description of the Related Art

In order to provide more purchasing options for consumers, toner cartridge manufacturers often offer toner cartridges for sale at various toner fill levels for a particular electrophotographic image forming device. For example, toner cartridges holding a greater amount of toner may be offered at a higher total price but a lower price per unit of toner than toner cartridges holding less toner. A universal toner cartridge design for all toner fill levels is often preferred in order to provide a consistent customer experience across all toner cartridge offerings for a particular model of image forming device. However, a universal toner cartridge design may be unnecessarily complex for lower toner fill levels. For example, components and features useful for higher toner fill levels may not be needed for lower toner fill levels. This complexity increases the manufacturing cost of the toner cartridge and may reduce the reliability of the toner cartridge at lower toner fill levels. For lower toner fill levels, a universal toner cartridge design may also increase the amount of residual toner remaining in the toner cartridge at the end of the toner cartridge's useful life due to the larger surface area required in the toner reservoir to accommodate higher toner fill levels. Accordingly, a reduced capacity toner cartridge for an electrophotographic image forming device is desired.

SUMMARY

A toner cartridge according to one example embodiment includes a housing having a toner reservoir. An outlet is positioned on the housing for exiting toner from the toner cartridge. An insert is selectably installable in the toner reservoir. The insert separates a first portion of the toner reservoir that is in fluid communication with the outlet from a remainder of the toner reservoir when the insert is installed in the toner reservoir providing a reduced capacity toner reservoir in the first portion of the toner reservoir.

A toner cartridge according to another example embodiment includes a housing having a toner reservoir. An outlet is positioned on the housing for exiting toner from the toner cartridge. A rotatable auger is operative to deliver toner from the toner reservoir to the outlet. A divider isolates a volume of the toner reservoir surrounding the auger that is in fluid communication with the outlet from a remainder of the toner reservoir such that the divider forms a reduced capacity toner reservoir surrounding the auger.

A method for toner cartridge manufacturing according to one example embodiment includes providing a plurality of toner cartridges having substantially the same exterior appearance. A first of the plurality of toner cartridges is provided that includes a volume available for storing toner in fluid communication with an outlet of the first toner cartridge having a first volume. A second of the plurality of toner cartridges is provided having a divider installed forming a reduced volume available for storing toner in fluid communication with an outlet of the second toner cartridge in comparison with the first volume.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
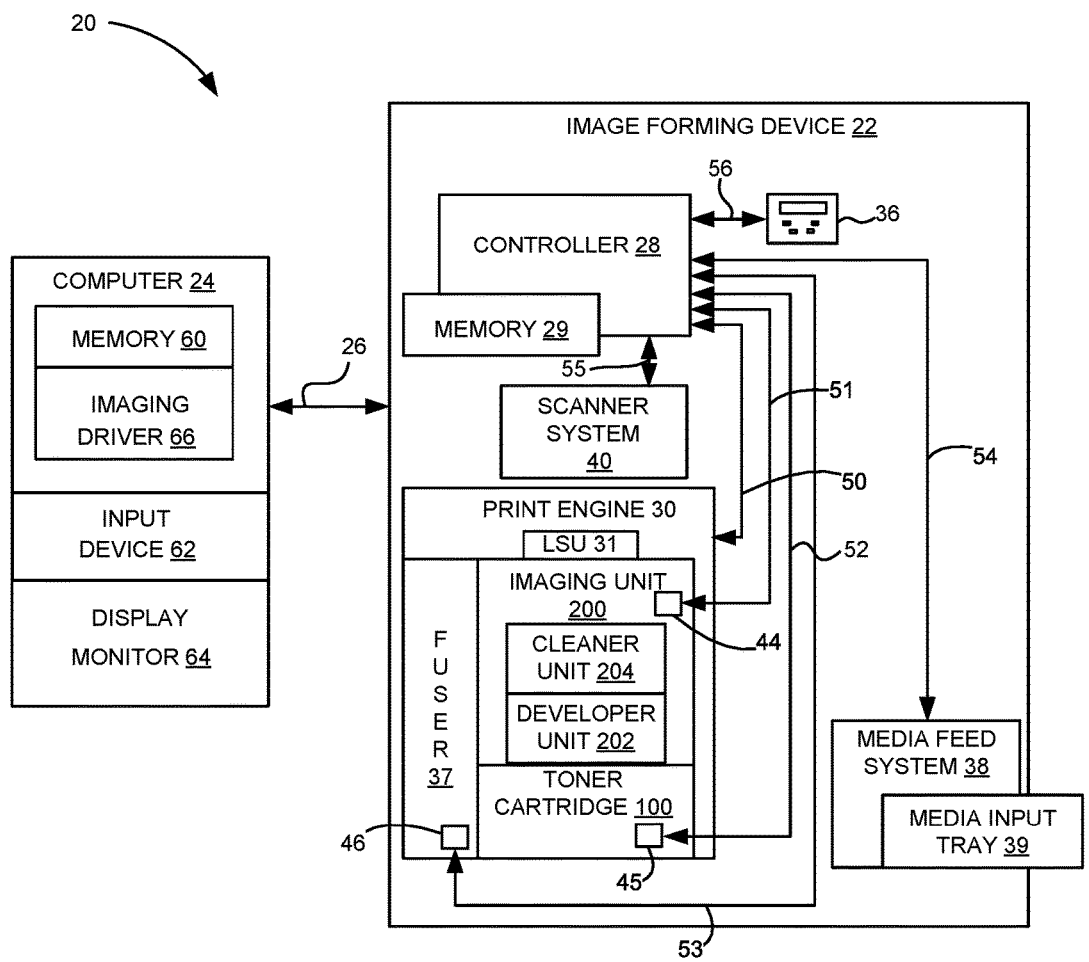
FIG. 1 is a block diagram of an imaging system according to one example embodiment.

Referring now to the drawings and particularly to FIG. 1, there is shown a block diagram depiction of an imaging system 20 according to one example embodiment. Imaging system 20 includes an image forming device 22 and a computer 24. Image forming device 22 communicates with computer 24 via a communications link 26. As used herein, the term "communications link" generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (AIO) device) that includes a controller 28, a print engine 30, a laser scan unit (LSU) 31, an imaging unit 200, a toner cartridge 100, a user interface 36, a media feed system 38, a media input tray 39 and a scanner system 40. Image forming device 22 may communicate with computer 24 via a standard communication protocol, such as, for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated electronic memory 29. The processor may include one or more integrated circuits in the form of a microprocessor or central processing unit and may be formed as one or more Application-specific integrated circuits (ASICs). Memory 29 may be any volatile or non-volatile memory or combination thereof, such as, for example, random access memory (RAM), read only memory (ROM), flash memory and/or non-volatile RAM (NVRAM). Memory 29 may be in the form of a separate memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with imaging unit 200 and processing circuitry 44 thereon via a communications link 51. Controller 28 communicates with toner cartridge 100 and processing circuitry 45 thereon via a communications link 52. Controller 28 communicates with a fuser 37 and processing circuitry 46 thereon via a communications link 53. Controller 28 communicates with media feed system 38 via a communications link 54. Controller 28 communicates with scanner system 40 via a communications link 55. User interface 36 is communicatively coupled to controller 28 via a communications link 56. Controller 28 processes print and scan data and operates print engine 30 during printing and scanner system 40 during scanning. Processing circuitry 44, 45, 46 may provide authentication functions, safety and operational interlocks, operating parameters and usage information related to imaging unit 200, toner cartridge 100 and fuser 37, respectively. Each of processing circuitry 44, 45, 46 includes a processor unit and associated electronic memory. As discussed above, the processor may include one or more integrated circuits in the form of a microprocessor or central processing unit and may be formed as one or more Application-specific integrated circuits (ASICs). The memory may be any volatile or non-volatile memory or combination thereof or any memory device convenient for use with processing circuitry 44, 45, 46.

Computer 24, which is optional, may be, for example, a personal computer, including electronic memory 60, such as RAM, ROM, and/or NVRAM, an input device 62, such as a keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes a laser scan unit (LSU) 31, toner cartridge 100, imaging unit 200 and fuser 37, all mounted within image forming device 22. Imaging unit 200 is removably mounted in image forming device 22 and includes a developer unit 202 that houses a toner sump and a toner development system. In one embodiment, the toner development system utilizes what is commonly referred to as a single component development system. In this embodiment, the toner development system includes a toner adder roll that provides toner from the toner sump to a developer roll. A doctor blade provides a metered uniform layer of toner on the surface of the developer roll. In another embodiment, the toner development system utilizes what is commonly referred to as a dual component development system. In this embodiment, toner in the toner sump of developer unit 202 is mixed with magnetic carrier beads. The magnetic carrier beads may be coated with a polymeric film to provide triboelectric properties to attract toner to the carrier beads as the toner and the magnetic carrier beads are mixed in the toner sump. In this embodiment, developer unit 202 includes a magnetic roll that attracts the magnetic carrier beads having toner thereon to the magnetic roll through the use of magnetic fields. Imaging unit 200 also includes a cleaner unit 204 that houses a photoconductive drum and a waste toner removal system.

Toner cartridge 100 is removably mounted in imaging forming device 22 in a mating relationship with developer unit 202 of imaging unit 200. An outlet port on toner cartridge 100 communicates with an inlet port on developer unit 202 allowing toner to be periodically transferred from toner cartridge 100 to resupply the toner sump in developer unit 202.

The electrophotographic printing process is well known in the art and, therefore, is described briefly herein. During a printing operation, laser scan unit 31 creates a latent image on the photoconductive drum in cleaner unit 204. Toner is transferred from the toner sump in developer unit 202 to the latent image on the photoconductive drum by the developer roll (in the case of a single component development system) or by the magnetic roll (in the case of a dual component development system) to create a toned image. The toned image is then transferred to a media sheet received by imaging unit 200 from media input tray 39 for printing. Toner may be transferred directly to the media sheet by the photoconductive drum or by an intermediate transfer member that receives the toner from the photoconductive drum. Toner remnants are removed from the photoconductive drum by the waste toner removal system. The toner image is bonded to the media sheet in fuser 37 and then sent to an output location or to one or more finishing options such as a duplexer, a stapler or a hole-punch.

Figure 2:
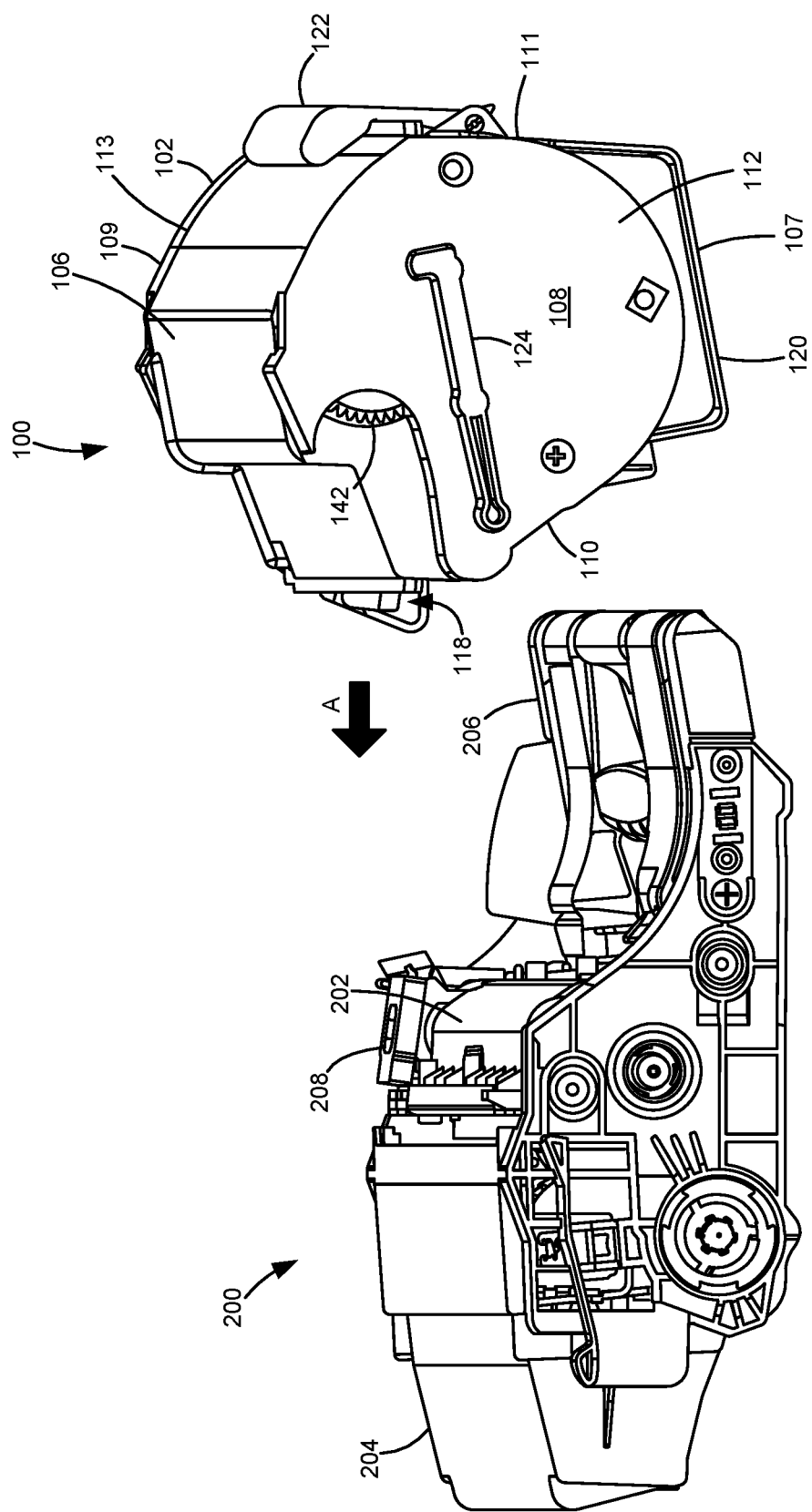
FIG. 2 is a perspective view of a toner cartridge and an imaging unit according to one example embodiment.

Referring now to FIG. 2, toner cartridge 100 and imaging unit 200 are shown according to one example embodiment. Imaging unit 200 includes a developer unit 202 and a cleaner unit 204 mounted on a common frame 206. Developer unit 202 includes a toner inlet port 208 positioned to receive toner from toner cartridge 100. As discussed above, imaging unit 200 and toner cartridge 100 are each removably installed in image forming device 22. Imaging unit 200 is first slidably inserted into image forming device 22. Toner cartridge 100 is then inserted into image forming device 22 and onto frame 206 in a mating relationship with developer unit 202 of imaging unit 200 as indicated by the arrow A shown in FIG. 2, which also indicates the direction of insertion of imaging unit 200 and toner cartridge 100 into image forming device 22. This arrangement allows toner cartridge 100 to be removed and reinserted easily when replacing an empty toner cartridge 100 without having to remove imaging unit 200. Imaging unit 200 may also be readily removed as desired in order to maintain, repair or replace the components associated with developer unit 202, cleaner unit 204 or frame 206 or to clear a media jam.

With reference to FIGS. 2-5, toner cartridge 100 includes a housing 102 having an enclosed reservoir 104 (FIG. 5) for storing toner. In the example embodiment illustrated, toner reservoir 104 is large enough to accommodate various toner fill levels, including, for example, enough toner for up to 20,000-25,000 printed pages or more. Housing 102 includes a top 106, a bottom 107, first and second sides 108, 109, a front 110 and a rear 111. Front 110 of housing 102 leads during insertion of toner cartridge 100 into image forming device 22 and rear 111 trails. In one embodiment, each side 108, 109 of housing 102 includes an end cap 112, 113 mounted, e.g., by fasteners or a snap-fit engagement, to side walls 114, 115 of a main body 116 of housing 102. An outlet port 118 in fluid communication with reservoir 104 is positioned on front 110 of housing 102 near side 109 for exiting toner from toner cartridge 100. Housing 102 may include legs 120 on bottom 107 to assist with the insertion of toner cartridge 100 into image forming device 22 and to support housing 102 when toner cartridge 100 is set on a flat surface. A handle 122 may be provided on top 106 or rear 111 of housing 102 to assist with insertion and removal of toner cartridge 100 into and out of image forming device 22.

Figure 3:
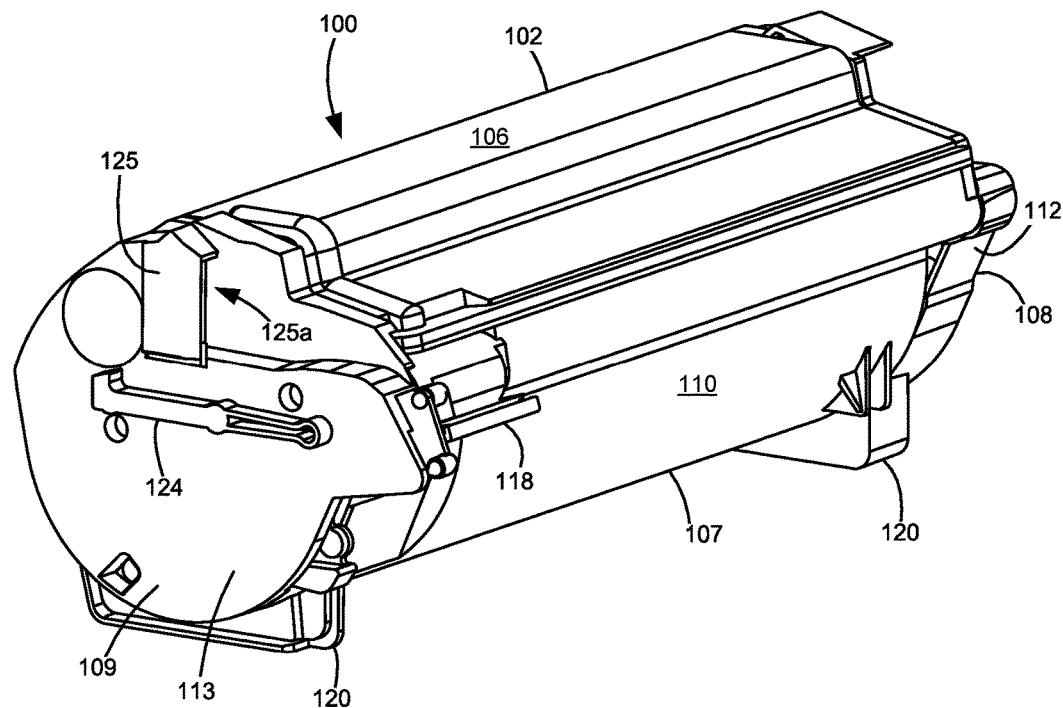
FIG. 3 is a front perspective view of the toner cartridge shown in FIG. 2.
Figure 4:
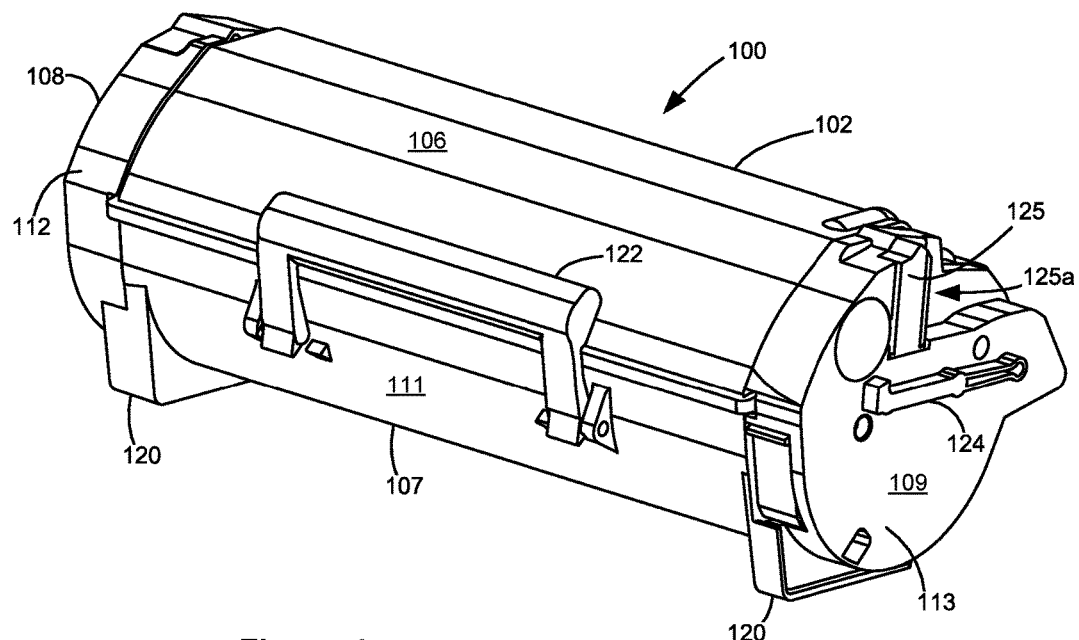
FIG. 4 is a rear perspective view of the toner cartridge shown in FIGS. 2 and 3.

Sides 108, 109 may each include an alignment guide 124 that extends outward from the respective side 108, 109 to assist the insertion of toner cartridge 100 into image forming device 22. Alignment guides 124 travel in corresponding guide slots in image forming device 22 that guide the insertion of toner cartridge 100 into image forming device 22. In the example embodiment illustrated, an alignment guide 124 is positioned on the outer side of each end cap 112, 113. Alignment guides 124 may run along a front-to-rear dimension of housing 102 as shown in FIGS. 2-4.

In the example embodiment illustrated, toner cartridge 100 includes an electrical connector 125 positioned on side 109 of housing 102. Electrical connector 125 includes electrical contacts for processing circuitry 45 of toner cartridge 100. In the example embodiment illustrated, electrical connector 125 includes a forward facing opening 125a that permits a corresponding electrical connector in image forming device 22 to mate with the electrical contacts of processing circuitry 45 in order to permit communication between toner cartridge 100 and image forming device 22.

Figure 5:
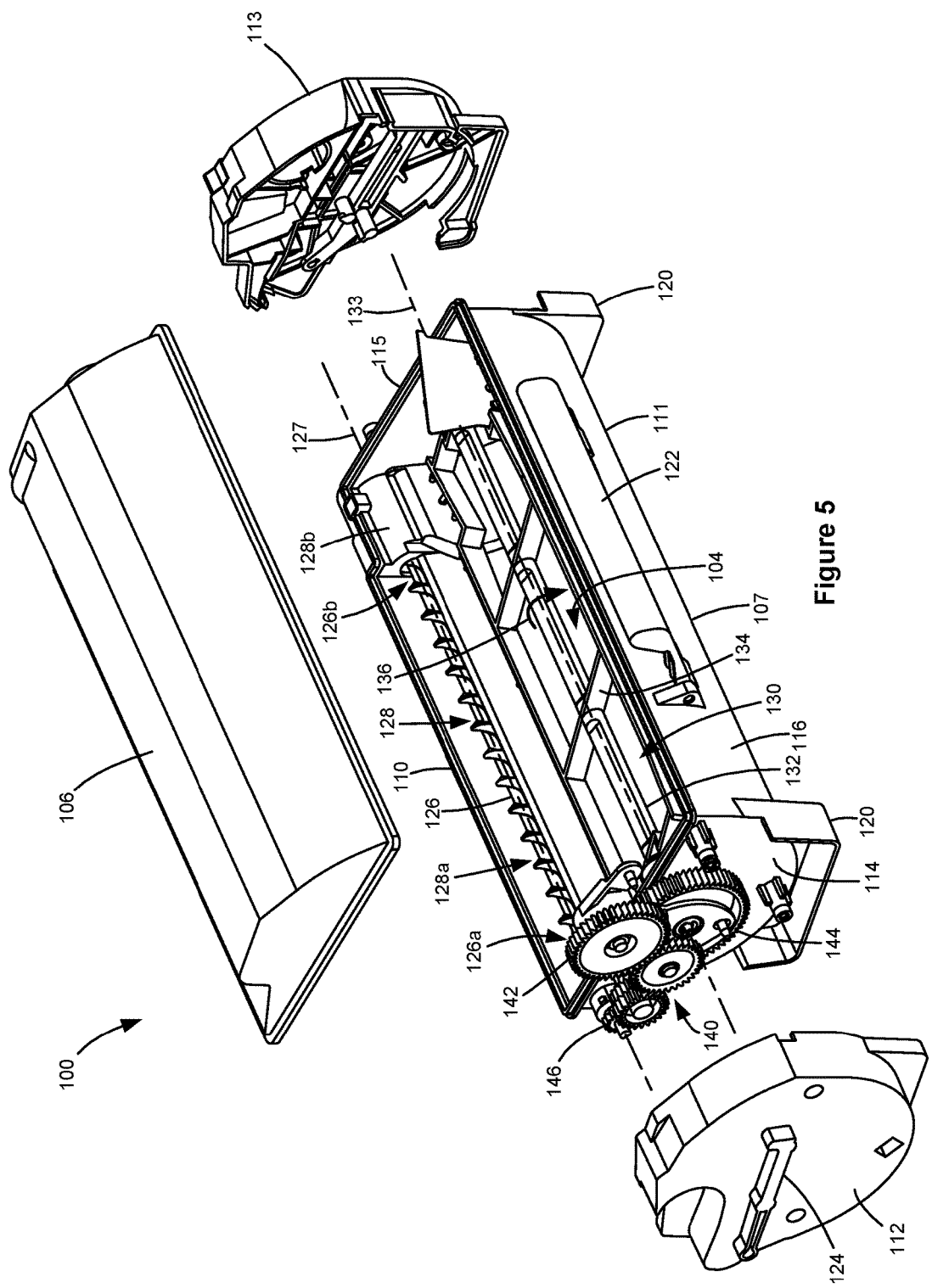
FIG. 5 is an exploded view of the toner cartridge shown in FIGS. 2-4 showing a reservoir for holding toner therein.

With reference to FIG. 5, in the example embodiment illustrated, an auger 126 having first and second ends 126a, 126b and a spiral screw flight is positioned in a channel 128 that runs along the front 110 of housing 102 from side 108 to side 109. Channel 128 may be integrally molded as part of the front 110 of main body 116 or formed as a separate component that is attached to the front 110 of main body 116. Channel 128 is oriented generally horizontal when toner cartridge 100 is installed in image forming device 22. Auger 126 includes a rotational axis 127. Rotation of auger 126 delivers toner in channel 128 to outlet port 118, which is positioned at the bottom of channel 128 so that gravity assists in exiting toner through outlet port 118. Channel 128 includes an open portion 128a and may include an enclosed portion 128b. Open portion 128a is open to toner reservoir 104 and extends from side 108 toward second end 126b of auger 126. Enclosed portion 128b of channel 128 extends from side 109 and encloses second end 126b of auger 126. In this embodiment, outlet port 118 is positioned at the bottom of enclosed portion 128b of channel 128.

A toner agitator assembly 130 is rotatably positioned within toner reservoir 104. Toner agitator assembly 130 includes a rotatable drive shaft 132 and one or more toner agitators 134 that extend outward in a cantilevered manner from drive shaft 132. Drive shaft 132 includes a rotational axis 133. In the example embodiment illustrated, rotational axis 133 of drive shaft 132 is parallel to rotational axis 127 of auger 126. In operation, drive shaft 132 rotates in an operative rotational direction 136. Toner agitators 134 rotate with drive shaft 132 around rotational axis 133 when drive shaft 132 rotates in operative rotational direction 136. As drive shaft 132 rotates, toner agitators 134 agitate and mix the toner stored in toner reservoir 104 and, in the embodiment illustrated, move toner toward channel 128 where auger 126 moves the toner to outlet port 118. In the example embodiment illustrated, first and second ends of drive shaft 132 extend through aligned openings in side walls 114, 115, respectively. However, drive shaft 132 may take other positions and orientations as desired. Bushings may be provided on an inner side of each side wall 114, 115 where drive shaft 132 passes through side walls 114, 115.

A drive train 140 is operatively connected to drive shaft 132 and may be positioned within a space formed between end cap 112 and side wall 114. Drive train 140 includes a main input gear 142 that engages with a drive transmission in image forming device 22 that provides rotational motion from an electric motor in image forming device 22 to main input gear 142. As shown in FIG. 3, in one embodiment, a front portion of main input gear 142 is exposed at the front 110 of housing 102 near the top 106 of housing 102 where main input gear 142 engages the drive transmission in image forming device 22. With reference back to FIG. 5, in the embodiment illustrated, drive train 140 also includes a drive gear 144 on one end of drive shaft 132 that is connected to main input gear 142 either directly or via one or more intermediate gears to rotate drive shaft 132. In the embodiment illustrated, drive train 140 also includes a drive gear 146 on first end 126a of auger 126 that is connected to main input gear 142 either directly or via one or more intermediate gears to rotate auger 126.

Figure 6:
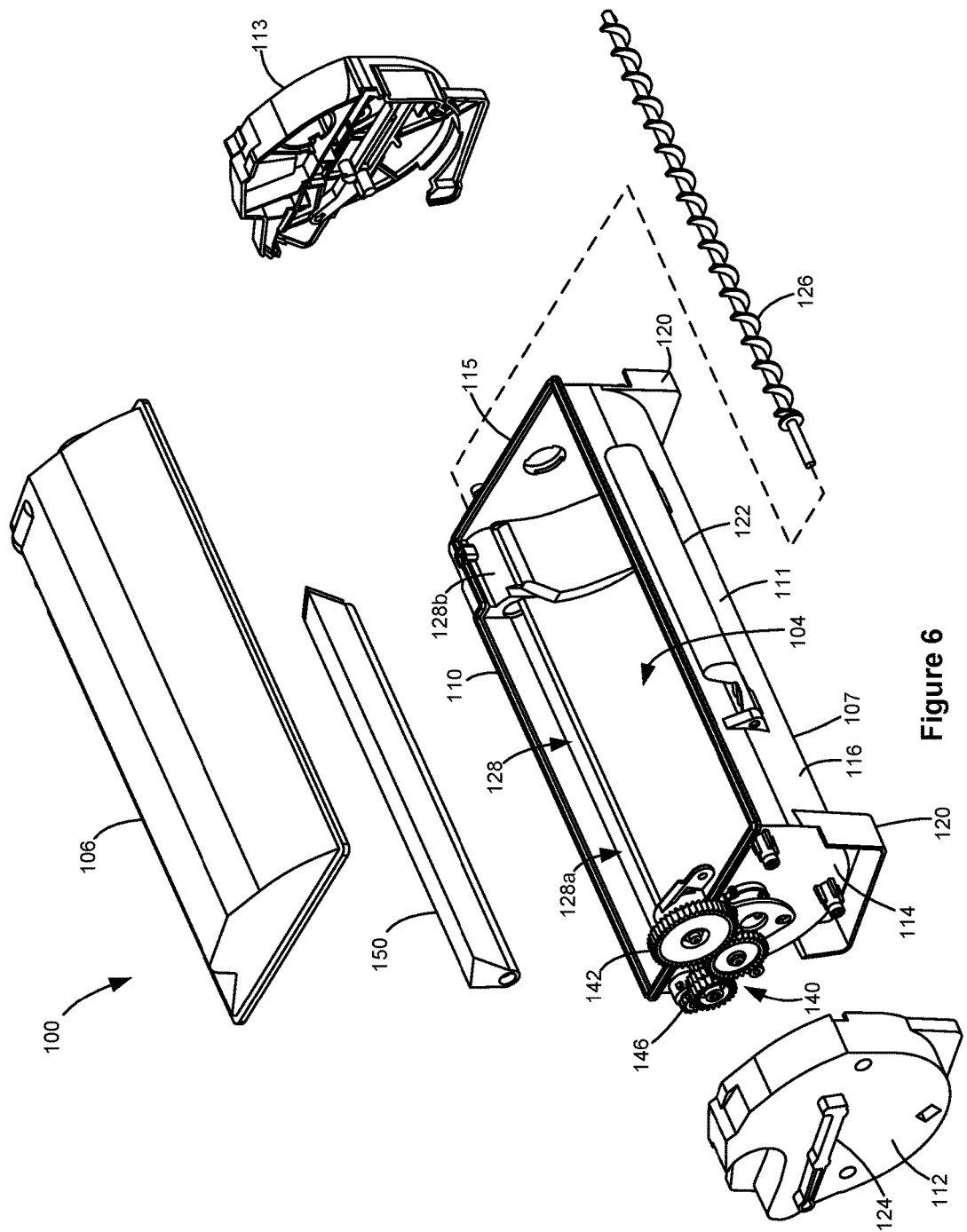
FIG. 6 is a first exploded view of the toner cartridge having an insert that provides a reduced capacity reservoir for lower toner fill levels according to one example embodiment.
Figure 7:
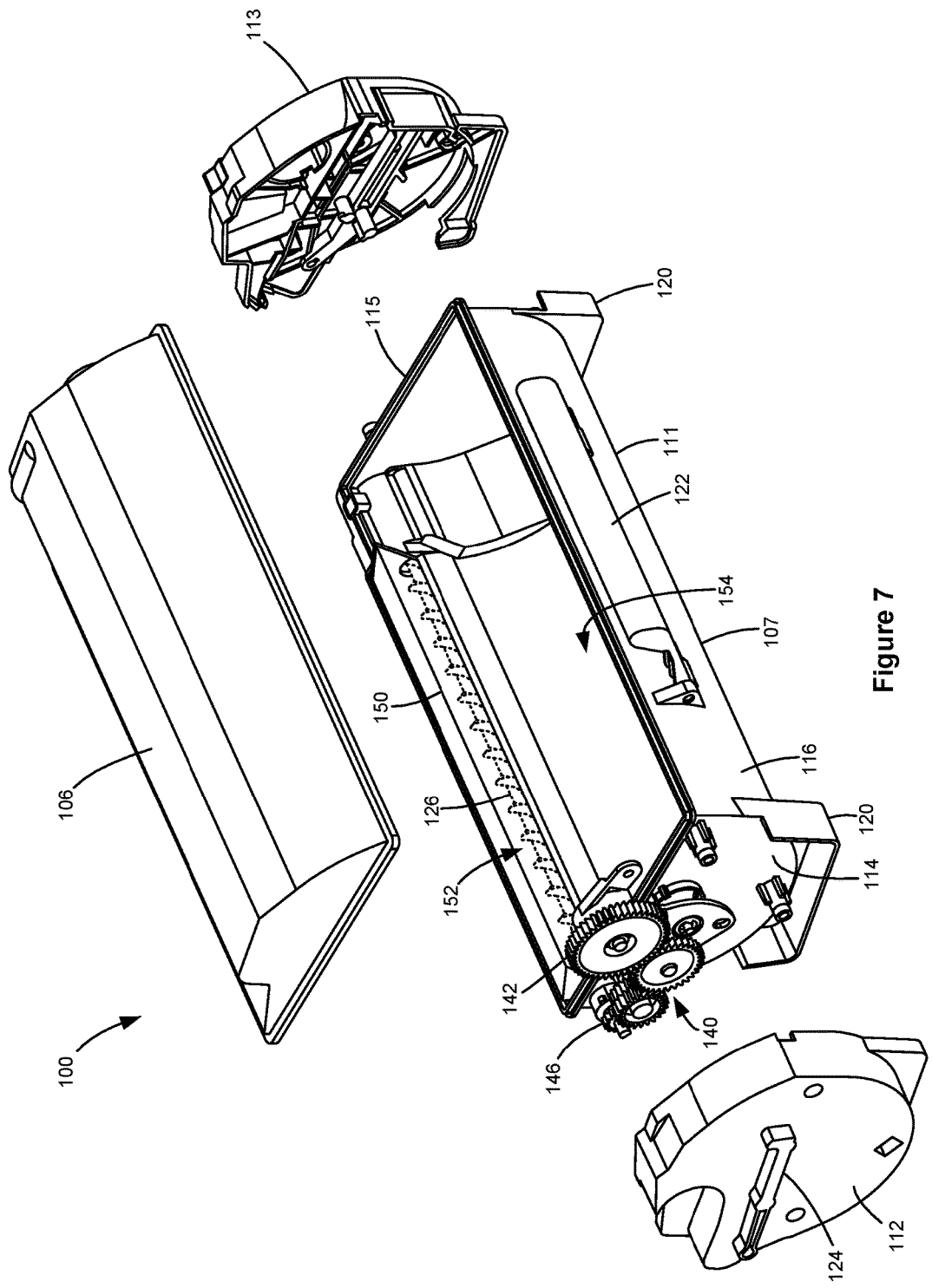
FIG. 7 is a second exploded view of the toner cartridge having the insert shown in FIG. 6.

FIGS. 6 and 7 show toner cartridge 100 having an insert 150 that provides a reduced capacity toner reservoir 152 for accommodating low toner fill levels, such as, for example, enough toner for a few hundred or a few thousand pages, depending on the capacity of reservoir 104. FIG. 6 is an exploded view of toner cartridge 100 having insert 150 and FIG. 7 shows insert 150 positioned in reservoir 104 according to one example embodiment with auger 126, which is obstructed from view by insert 150, illustrated in broken line. Insert 150 is positioned in reservoir 104 of housing 102 and separates a portion of reservoir 104 that forms reduced capacity toner reservoir 152 from the rest of reservoir 104. The volume of reduced capacity toner reservoir 152 formed by insert 150 is typically smaller than a remaining portion 154 of toner reservoir 104 that is outside of reduced capacity toner reservoir 152. In the example embodiment illustrated, insert 150 isolates the portion of reservoir 104 surrounding auger 126 and channel 128 from the rest of toner reservoir 104, dividing reservoir 104 into reduced capacity toner reservoir 152 and remaining portion 154 of toner reservoir 104. In this embodiment, toner in reduced capacity toner reservoir 152 is positioned above and around auger 126 so that rotation of auger 126 feeds the toner in reduced capacity toner reservoir 152 to outlet port 118 where the toner exits toner cartridge 100. In the example embodiment illustrated, reduced capacity toner reservoir 152 formed by insert 150 is sealed from remaining portion 154 of toner reservoir 104 in order to prevent toner from leaking from reduced capacity toner reservoir 152 into remaining portion 154 of toner reservoir 104. Accordingly, for a set of toner cartridges 100 for a given image forming device 22, low toner fill levels may be provided in reduced capacity toner reservoir 152 using insert 150 as shown in FIGS. 6 and 7 and larger toner fill levels may be provided in reservoir 104 by omitting insert 150 as shown in FIG. 5.

With continued reference to FIGS. 6 and 7, insert 150 allows toner to be concentrated above and around auger 126 at low toner fill levels rather than being distributed throughout the entire toner reservoir 104. This helps reduce the amount of residual toner remaining in toner cartridge 100 at the end of the useful life of toner cartridge 100 by reducing the surface area of reservoir 104 occupied by toner. The use of insert 150 also reduces variation in the amount of residual toner permitting the initial toner fill of toner cartridge 100 to be reduced while still ensuring that page yields are met.

In some embodiments, when insert 150 is used for low toner fill levels, components may be omitted from remaining portion 154 of toner reservoir 104 in order to reduce the cost of toner cartridge 100. For example, in the embodiment illustrated, the use of insert 150 to form reduced capacity toner reservoir 152 permits the omission of toner agitator assembly 130 including drive shaft 132 and toner agitators 134 as well as the omission of drive gear 144 connected to drive shaft 132.

In the example embodiment illustrated, because insert 150 is confined to an internal portion of toner cartridge 100, the use of insert 150 to form reduced capacity toner reservoir 152 does not affect the exterior appearance of toner cartridge 100 so that customer usability is unaffected. That is, toner cartridge 100 installs into and removes from image forming device 22 the same regardless of whether insert 150 is included. The positioning features of toner cartridge 100 (e.g., legs 120, alignment guides 124) and interface points with image forming device 22 and imaging unit 200 (e.g., outlet port 118, electrical connector 125, main input gear 142) are also unchanged by the inclusion or omission of insert 150 such that the force balance and exterior loads on toner cartridge 100 remain the same.

Figure 8:
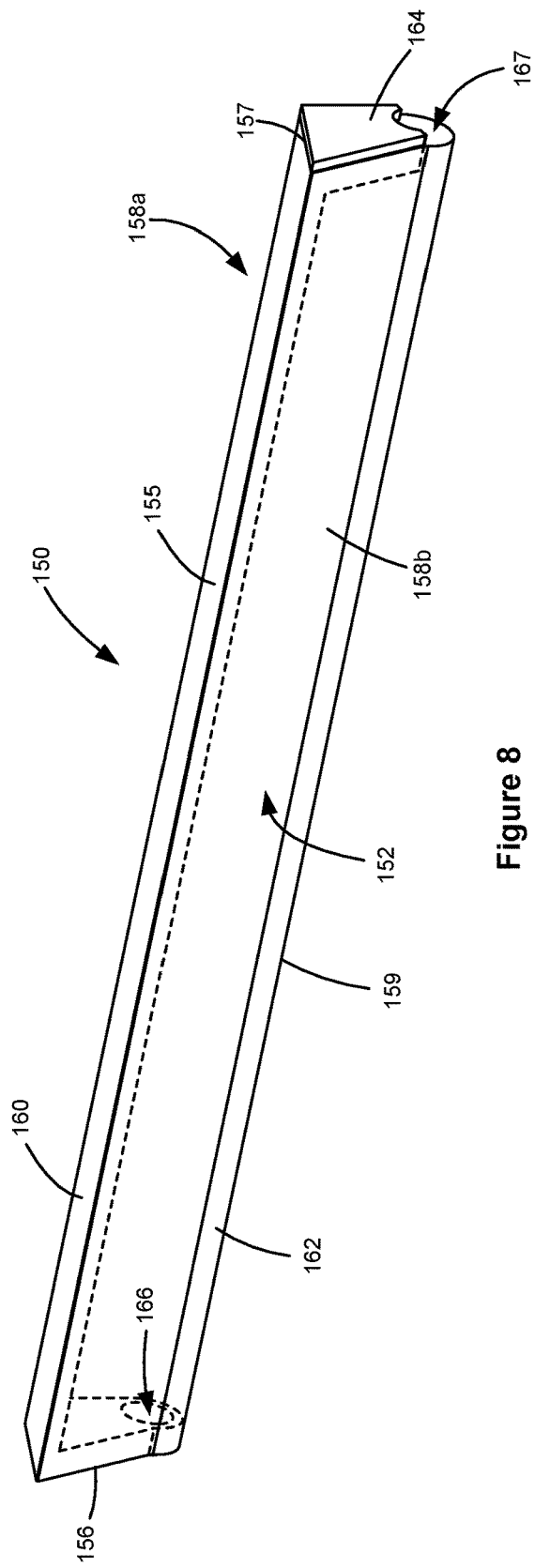
FIG. 8 is a perspective view of the insert shown in FIGS. 6 and 7.
Figure 9:
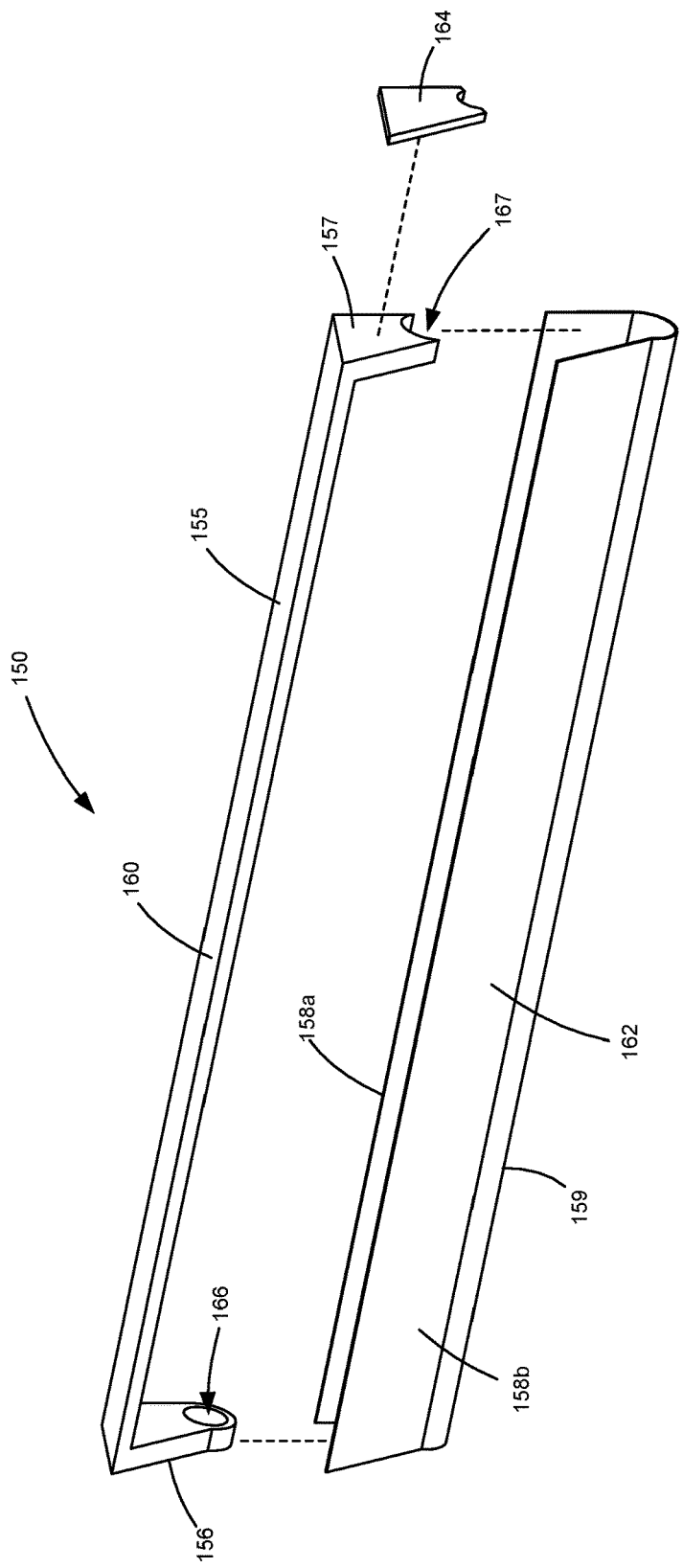
FIG. 9 is an exploded view of the insert shown in FIGS. 6-8.

FIGS. 8 and 9 show insert 150 in greater detail according to one example embodiment. In this embodiment, insert 150 includes a frame 160 and a film 162 wrap bonded to frame 160 along the length of frame 160. Frame 160 is composed of a suitably rigid material such as, for example, a suitable plastic and may be formed, for example, by injection molding, vacuum molding or other suitable means. In the example embodiment illustrated, frame 160 forms a top 155, a first end 156 and a second end 157 of insert 150. Film 162 forms front and rear walls 158a, 158b and a bottom 159 of insert 150. In the example embodiment illustrated, the inner surfaces of front and rear walls 158a, 158b are vertical or steeply sloped downward in order to encourage toner to flow downward toward auger 126 via gravity and normal vibration of toner cartridge 100 to permit toner feed by auger 126 toward outlet port 118 and to help reduce the amount of residual toner in reduced capacity toner reservoir 152. In some embodiments, film 162 is composed of an anti-static film in order to help reduce the amount of residual toner on film 162 by reducing the amount of electrostatic interaction between the toner and film 162. A seal 164 is positioned at end 157 of insert 150 proximate to outlet port 118 in order to prevent toner from leaking from the end of reduced capacity toner reservoir 152. Seal 164 may be composed of any suitable material such as, for example, foam. In the embodiment illustrated, a respective opening 166, 167 is formed at each longitudinal end 156, 157 of insert 150 permitting auger 126 to pass through insert 150 to mate with drive gear 146 and to enter enclosed portion 128b of channel 128. In the example embodiment illustrated, insert 150 is placed in open portion 128a of channel 128 before top 106 is attached to housing 102. Auger 126 is then slid through openings 166, 167 into insert 150. Auger 126 is then rotatably mounted to housing 102 and sealed such that auger 126 retains insert 150 in channel 126. Top 106 is then attached to housing 102 along with end caps 112, 113 and any gears, linkages or other external components of toner cartridge 100. However, it will be appreciated that insert 150 may take any suitable construction and may be mounted to housing 102 according to any suitable method. For example, in other embodiments, insert 150 attaches to housing 102 via one or more snap or catch features as desired. Insert 150 may also be attached to housing 102 by suitable fasteners or adhesives.

Reduced capacity toner reservoir 152 may be filled by any suitable method. For example, in the embodiment illustrated, toner may be fed into reduced capacity toner reservoir 152 through outlet port 118 while rotating auger 126 counter to its operative rotational direction. In other embodiments, toner may be fed into reduced capacity toner reservoir 152 through a fill port in frame 160 and a corresponding access port in housing 102. The fill port of frame 160 would then be plugged after toner is added to reduced capacity toner reservoir 152 to prevent toner leakage.

Figure 10:
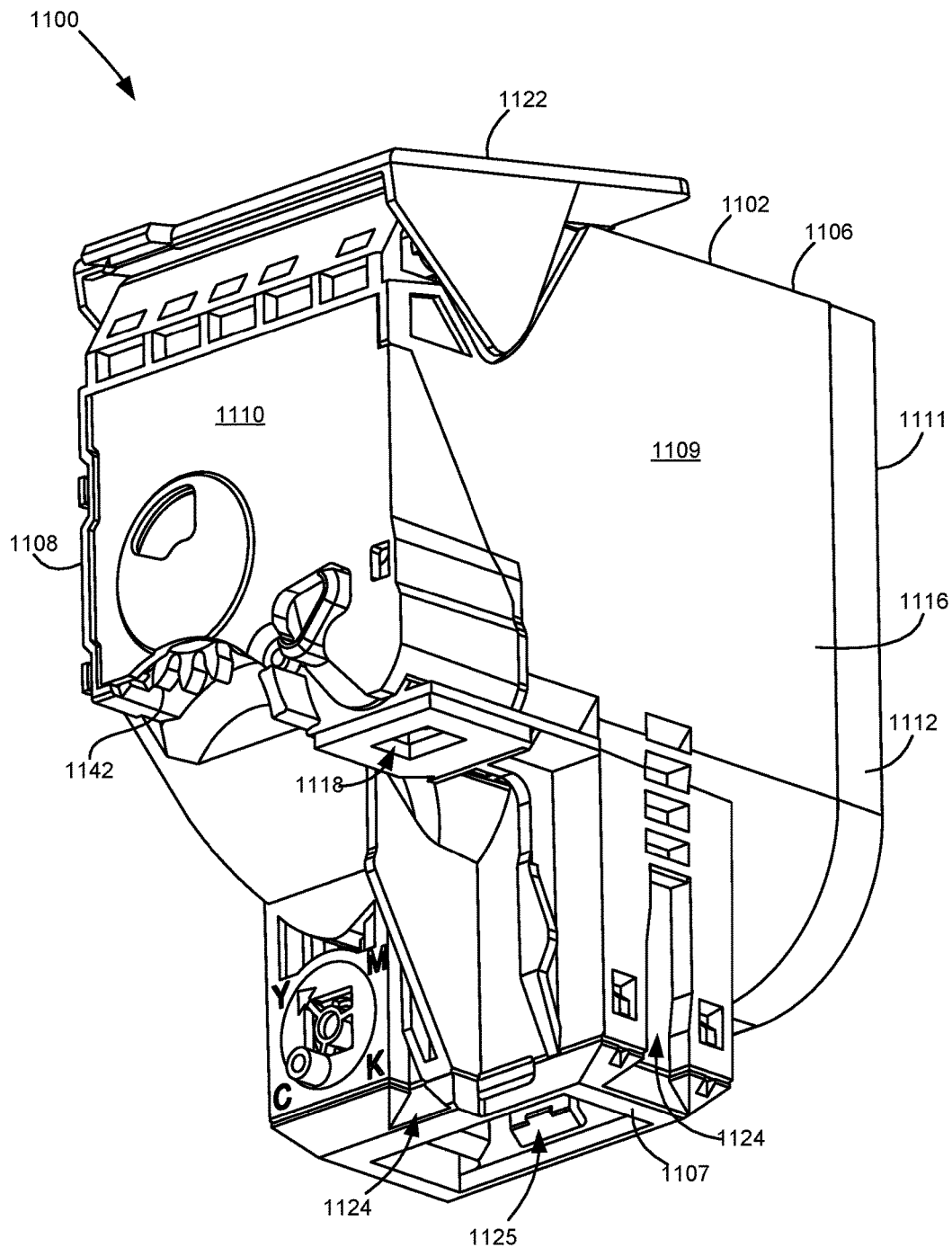
FIG. 10 is a front perspective view of a toner cartridge according to another example embodiment.

FIGS. 10-13 illustrate a toner cartridge 1100 that selectably utilizes an insert 1150 to form a reduced capacity toner reservoir 1152 as desired according to another example embodiment. With reference to FIG. 10, toner cartridge 1100 includes a housing 1102 having a top 1106, a bottom 1107, a front 1110, a rear 1111 and a pair of sides 1108, 1109 and forming a reservoir 1104 (FIG. 12) therein. In the example embodiment illustrated, housing 1102 is comprised of an end cap 1112 mounted on, such as by ultrasonic welding, a main body 1116 at the rear 1111 of cartridge 1100. Toner cartridge 1100 includes an outlet port 1118 for transferring toner to an inlet port of a corresponding developer unit. Outlet port 1118 is formed as a downward facing opening on the front 1110 of housing 1102. A handle 1122 may be positioned on top 1106 to facilitate grasping and manipulating cartridge 1100 during insertion and removal from image forming device 22.

Figure 11:
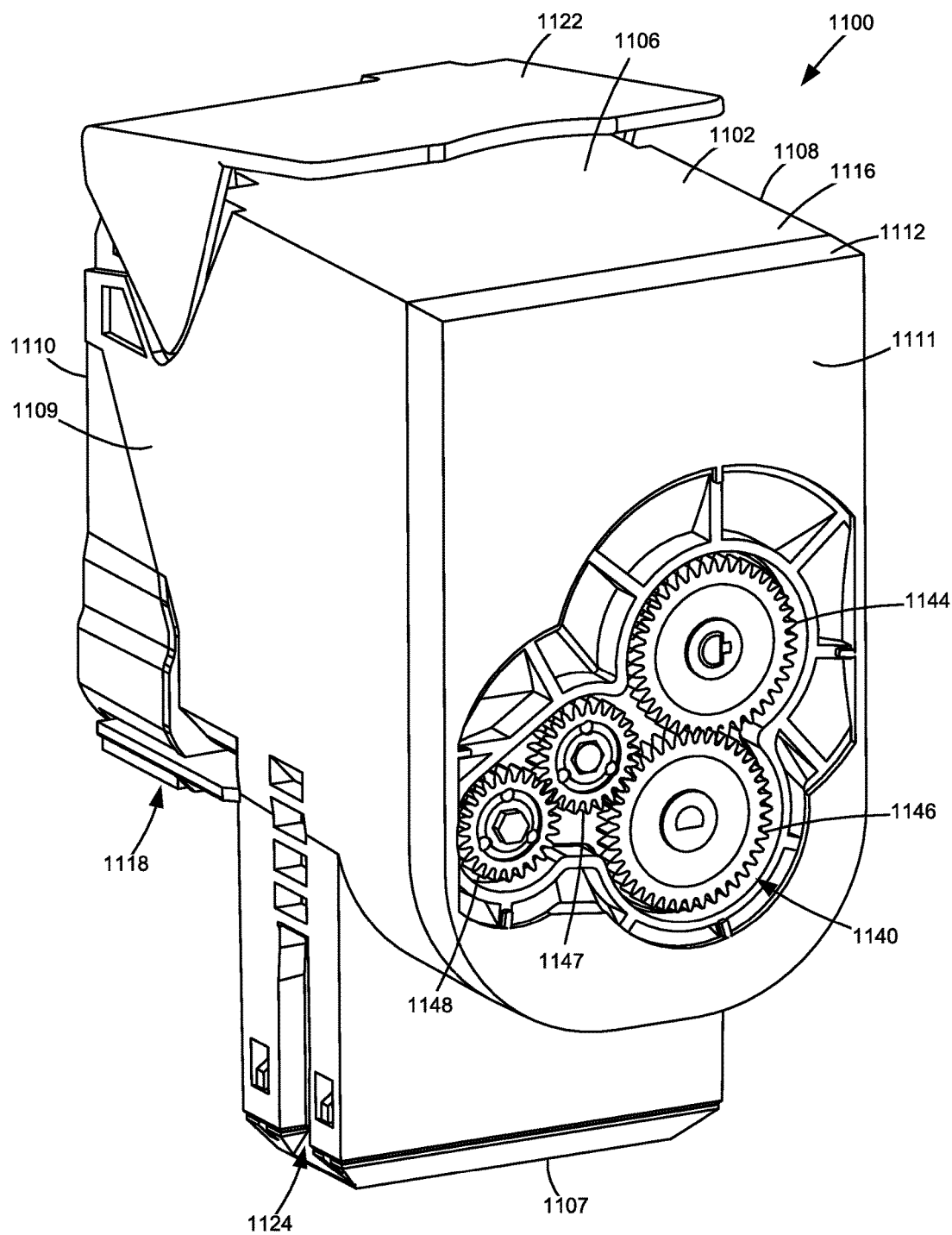
FIG. 11 is a rear perspective view of the toner cartridge shown in FIG. 10 having a portion of an end cap omitted.

Toner cartridge 1100 also includes a main input gear 1142 positioned on the front 1110 of housing 1102. Main input gear 1142 meshes with and receives rotational power from a corresponding gear in image forming device 22 in order to provide rotational power to various toner agitators positioned within reservoir 1104 for moving toner to outlet port 1118 as discussed in greater detail below. FIG. 11 shows toner cartridge 1100 with a portion of end cap 1112 omitted. In the example embodiment illustrated, main input gear 1142 is rotatably connected to a drive train 1140 that is positioned between end cap 1112 and rear 1111 of main body 1116. Drive train 1140 aids in transferring rotational power from main input gear 1142 to the toner agitators positioned within reservoir 1104 as discussed in greater detail below.

With reference back to FIG. 10, toner cartridge 1100 may also include various alignment members 1124 that align toner cartridge 1100 during insertion of toner cartridge 1100 into image forming device 22. For example, alignment members 1124 may include a combination of projections that project outwardly from sides 1108, 1109 of housing 1102 and/or elongated slots formed as depressions in sides 1108, 1109 that mate with corresponding slots and/or projections, respectively, to ensure accurate positioning of toner cartridge 1100. Toner cartridge 1100 may also include an electrical connector 1125 that includes electrical contacts for processing circuitry 45 of toner cartridge 1100 for communicating with image forming device 22.

Figure 12:
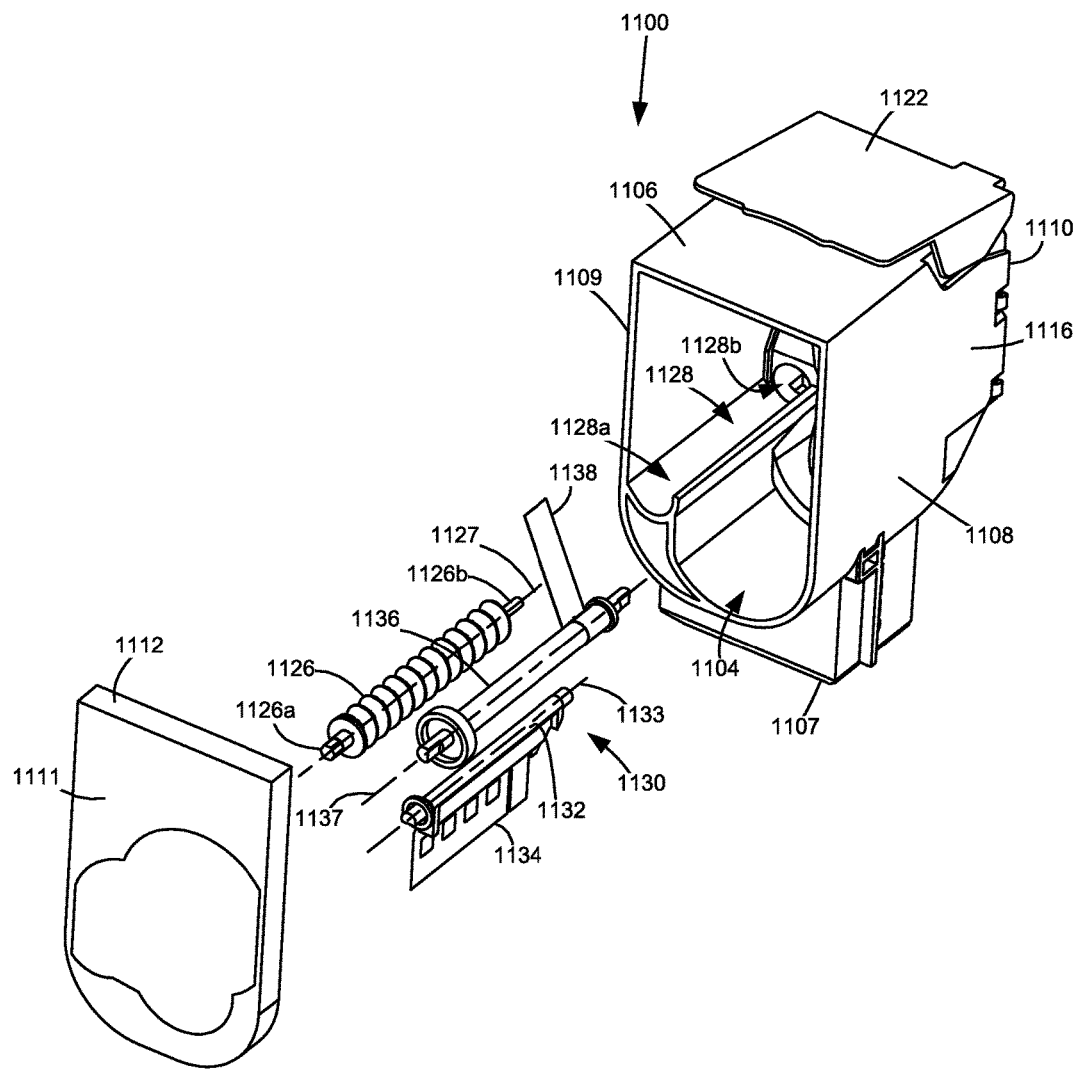
FIG. 12 is an exploded view of the toner cartridge shown in FIGS. 10 and 11 showing a reservoir for holding toner therein.

FIG. 12 is an exploded view of toner cartridge 1100 illustrating toner reservoir 1104 according to one example embodiment. In the example embodiment illustrated, an auger 1126 having first and second ends 1126a, 1126b and a spiral screw flight is positioned in a channel 1128 that runs along side 1109 of housing 1102 from front 1110 to rear 1111. Channel 1128 is oriented generally horizontal when toner cartridge 1100 is installed in image forming device 22. Auger 1126 includes a rotational axis 1127. Rotation of auger 1126 delivers toner in channel 1128 to outlet port 1118, which is positioned at the bottom of channel 1128 so that gravity assists in exiting toner through outlet port 1118. Channel 1128 includes an open portion 1128a and may include an enclosed portion 1128b. Open portion 1128a is open to toner reservoir 1104 and extends from rear 1111 toward second end 1126b of auger 1126. Enclosed portion 1128b of channel 1128 extends from front 1110 and encloses second end 1126b of auger 1126. In this embodiment, outlet port 1118 is positioned at the bottom of enclosed portion 1128b of channel 1128. In this configuration, enclosed portion 1128b of channel 1128 regulates the amount of toner delivered by auger 1126 to outlet port 1118 in order to provide a more consistent flow rate of toner out of toner cartridge 1100.

A toner agitator assembly 1130 is rotatably positioned within toner reservoir 1104. Toner agitator assembly 1130 includes a rotatable drive shaft 1132 and one or more toner agitators 1134 that extend outward from drive shaft 1132. Drive shaft 1132 includes a rotational axis 1133 that is parallel to rotational axis 1127 of auger 1126. Drive shaft 1132 is spaced toward side 1108 from channel 1128 at roughly the same height as auger 1126 (e.g., slightly lower than auger 1126 in the embodiment illustrated). As drive shaft 1132 rotates, toner agitators 1134 rotate around rotational axis 1133 agitating and mixing the toner stored in reservoir 1104 and pushing toner into open portion 1128a of channel 1128 to supply auger 1126 with toner to deliver to outlet port 1118. Toner agitator assembly 1130 also includes a rotatable transfer shaft 1136 positioned within toner reservoir 102. Transfer shaft 1136 includes a rotational axis 1137 that is parallel to rotational axis 1127 of auger 1126 and rotational axis 1133 of drive shaft 1132 and may include one or more toner agitators 1138 that extend outward from transfer shaft 1136. Transfer shaft 1136 is positioned higher than auger 1126 and drive shaft 1132 and is spaced toward side 1108 from channel 1128.

With reference to FIGS. 11 and 12, in the example embodiment illustrated, a first end of transfer shaft 1136 is directly connected to main input gear 1142 such that rotation of main input gear 1142 causes transfer shaft 1136 to rotate. A second end of transfer shaft 1136 is directly connected to a drive gear 1144 of drive train 1140 on rear 1111 of housing 1102. In this manner, transfer shaft 1136 transfers rotational motion from main input gear 1142 on front 1110 of housing 1102 to drive train 1140 on rear 1111 of housing 1102. In the example embodiment illustrated, drive gear 1144 is meshed with and provides rotational motion to a drive gear 1146 that is directly connected to drive shaft 1132 in order to rotate toner agitator 1134. Drive gear 1144 also provides rotational motion through an idler gear 1147 to a drive gear 1148 that is directly connected to auger 1126 in order to rotate auger 1126. Of course, it will be appreciated that rotational motion may be provided to drive shaft 1132, transfer shaft 1136 and auger 1126 by any suitable connections.

Figure 13:
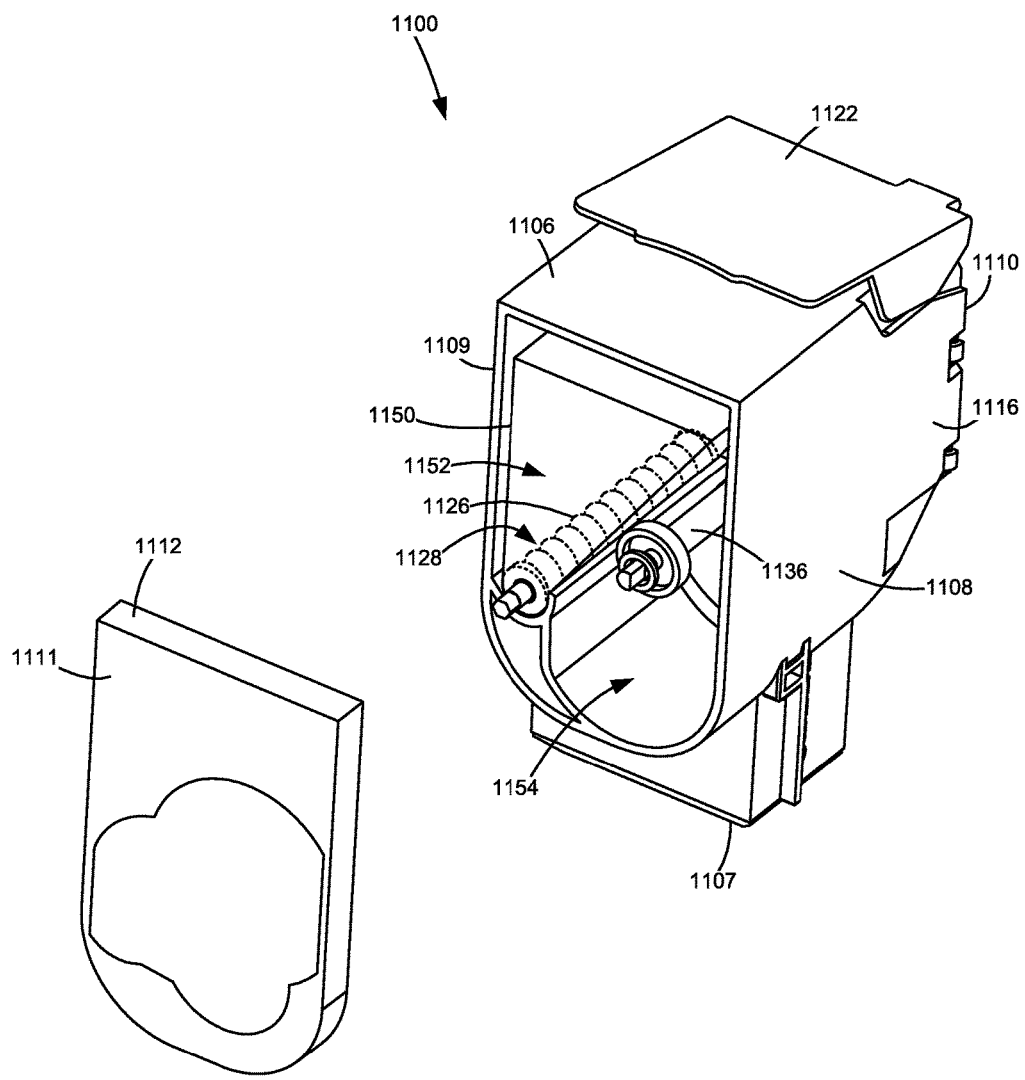
FIG. 13 is an exploded view of the toner cartridge shown in FIGS. 10-12 having an insert that provides a reduced capacity reservoir for lower toner fill levels according to one example embodiment.

FIG. 13 shows toner cartridge 1100 having an insert 1150 that provides a reduced capacity toner reservoir 1152 for accommodating low toner fill levels according to one example embodiment with auger 1126, which is obstructed from view by insert 1150, illustrated in broken line. Insert 1150 is positioned in reservoir 1104 of housing 1102 and separates a portion of reservoir 1104 that forms reduced capacity toner reservoir 1152 from the rest of reservoir 1104 as discussed above. In the example embodiment illustrated, insert 1150 isolates the portion of reservoir 1104 surrounding auger 1126 and channel 1128 from the rest of toner reservoir 1104, dividing reservoir 1104 into reduced capacity toner reservoir 1152 and a remaining portion 1154 of toner reservoir 114. In this embodiment, toner in reduced capacity toner reservoir 1152 is positioned above and around auger 1126 so that rotation of auger 1126 feeds the toner in reduced capacity toner reservoir 1152 to outlet port 1118 where the toner exits toner cartridge 1100 as discussed above. Accordingly, for a set of toner cartridges 1100 for a given image forming device 22, low toner fill levels may be provided in reduced capacity toner reservoir 1152 using insert 1150 as shown in FIG. 13 and larger toner fill levels may be provided in reservoir 1104 by omitting insert 1150 as shown in FIG. 12. Insert 1150 may also permit the omission of components from remaining portion 1154 of toner reservoir 1104 for low toner fill levels as discussed above. For example, in the embodiment illustrated, the use of insert 1150 to form reduced capacity toner reservoir 1152 permits the omission of drive shaft 1132, toner agitators 1134 and toner agitators 1138. Further, as discussed above, the use of insert 1150 to form reduced capacity toner reservoir 1152 does not affect the exterior appearance of toner cartridge 1100 so that customer usability is unaffected.

The reduced capacity toner reservoirs 152, 1152 formed by inserts 150, 1150 discussed above are merely examples and are not intended to be limiting. Those skilled in the art will appreciate that inserts of any suitable size, shape, construction and location may be utilized to provide a reduced capacity toner reservoir as desired. Further, although the example embodiments discussed above includes a pair of replaceable units in the form of a toner cartridge and imaging unit, it will be appreciated that the replaceable unit(s) of image forming device 22 may employ any suitable configuration as desired. For example, in one embodiment, the main toner supply for image forming device 22, developer unit 202 and cleaner unit 204 are housed in one replaceable unit. In another embodiment, the main toner supply for image forming device 22 and developer unit 202 are provided in a first replaceable unit and cleaner unit 204 is provided in a second replaceable unit. In addition, although the example image forming device 22 discussed above includes one toner cartridge and corresponding imaging unit, in the case of an image forming device configured to print in color, separate replaceable units may be used for each toner color needed. For example, in one embodiment, the image forming device includes four toner cartridges and four corresponding imaging units, each toner cartridge containing a particular toner color (e.g., black, cyan, yellow and magenta) and each imaging unit corresponding with one of the toner cartridges to permit color printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner cartridge, comprising:
   a housing having a toner reservoir;
   an outlet on the housing for exiting toner from the toner cartridge;
   a rotatable auger operative to deliver toner from the toner reservoir to the outlet; and
   a divider that isolates a volume of the toner reservoir surrounding the auger that is in fluid communication with the outlet from a remainder of the toner reservoir such that the divider forms a reduced capacity toner reservoir surrounding the auger,
   wherein the divider is wrapped under the auger along a length of the auger.

2. The toner cartridge of claim 1, wherein the reduced capacity toner reservoir surrounding the auger is sealed from the remainder of the toner reservoir.

3. The toner cartridge of claim 1, wherein a volume of the reduced capacity toner reservoir is smaller than a volume of the remainder of the toner reservoir.

4. The toner cartridge of claim 1, wherein at least one component operative with the remainder of the toner reservoir is omitted.

5. The toner cartridge of claim 1, wherein the remainder of the toner reservoir does not include a movable toner agitator.

* * * * *